3,769,331
PROCESS FOR THE PREPARATION OF ACETATES OF 1,3-PROPANEDIOL
Herbert Kuckertz, Frankfurt am Main, Hans-Jurgen Arpe, Fischbach, Taunus, and Lothar Schulz, Bad Soden, Taunus, Germany, assignors to Farbwerke Hoechst Aktiengesellschaft vormals Meister Lucius & Bruning, Frankfurt am Main, Germany
No Drawing. Filed Nov. 19, 1971, Ser. No. 200,596
Claims priority, application Germany, Nov. 21, 1970, P 20 57 399.3
Int. Cl. C07c 67/00
U.S. Cl. 260—491                6 Claims

ABSTRACT OF THE DISCLOSURE

Acetates of 1,3-propanediol are prepared by catalytic hydrogenation of O-acetoxy-propionaldehyde in acetic solution.

---

The present invention relates to a process for the preparation of acetates of 1,3-propanediol.

Acetates of 1,3-propanediol constitute good solvents for numerous organic compounds and polymers. Moreover, they are important starting materials in the manufacture of 1,3-propanediol, which, for its part, is a valuable component for making polyesters and a suitable starting product for pesticides and pharmaceutical products. Until recently, 1,3-propanediol has mostly been produced in industry by distillative separation from the glycerol lye liquors of the fat saponification, in which it is formed by the action of microorganisms on glycerol. Nowadays, it is also produced by hydrogenation of $\beta$-hydroxypropionaldehyde, which can be obtained by the addition of water on acrolein.

The present invention provides a process for the preparation of acetates of 1,3-propanediol which comprises hydrogenating $\beta$-acetoxy-propionaldehyde in acetic acid solution with hydrogen under a pressure in the range of from 1 to 500 atmospheres, preferably 100 to 350 atmospheres, at a temperature below 250° C., preferably 0 to 150° C., using a catalyst containing nickel, rhodium, palladium, platinum or a mixture thereof, preferably nickel.

The mono- and diacetate of 1,3-propanediol can be transformed into the free 1,3-propanediol in known manner by reesterification or saponification.

As compared with the known process for the manufacture of 1,3-propanediol mentioned above, the process of the invention offers the advantage that the starting products are readily available in uniform quality and that all reaction stages are highly selective. The glycerol lye liquors required in the known process are not available in a sufficient amount and with adjustable content of 1,3-propanediol. Moreover, the production of 1,3-propanediol from $\beta$-hydroxy-propionaldehyde gives relatively low yields owing to the formation of a great number of useless by-products.

$\beta$-Acetoxy-propionaldehyde is generally prepared by adding acetic acid on acrolein with the aid of a catalyst. In this reaction the degree of conversion is not quantitative, i.e. unreacted acrolein and unreacted acetic acid have to be separated in order to obtain pure $\beta$-acetoxy-propionaldehyde. It is known that the $\beta$-acetoxy-propionaldehyde obtained is unstable, that is to say it tends to decomposition. This tendency is especially pronounced at temperatures above room temperature and in the presence of a catalyst, for example an acid or metal salt, especially a salt containing acetate ions. It could, therefore, be expected that the decomposition would also be catalyzed by acetic acid.

It has surprisingly been found, however, that $\beta$-acetoxy-propionaldehyde can be hydrogenated very selectively in acetic acid solution under suitable reaction conditions to yield acetates of 1,3-propanediol, i.e. under appropriate conditions decomposition occurs to a minor extent only.

A suitable starting material for the process of the invention can be prepared, for example, by passing acetic acid and acrolein over a basic ion exchanger at a temperature of from 20 to 60° C., separating the unreacted acrolein under reduced pressure in a thin layer evaporator, and leaving the unreacted acetic acid in the formed $\beta$-acetoxy-propionaldehyde. In this manner, the proportion of acetic acid to $\beta$-acetoxy-propionaldehyde can be varied during the manufacture of the starting product by selecting a corresponding excess of acetic acid.

The starting mixture is preferably prepared from anhydrous acetic acid and acrolein poor in water. The concentration of acetic acid in the mixture should amount to 5 to 99%, preferably 10 to 90%. The selectivity increases with an increasing concentration of acetic acid. The acetic acid concentration in the mixture is only limited for practical and economical reasons inasmuch as the acetic acid must be removed, for example by distillation, in order to isolate the desired final products.

On principle, all hydrogenation catalysts that are active in an acetic acid medium may be used. However, those catalysts are preferred which, on the one hand, promote the transformation of the carbonyl group into the hydroxyl group at as low as possible a temperature and, on the other, do not catalyze or catalyze to a minor extent only the decomposition of $\beta$-acetoxy-propionaldehyde. Suitable catalysts are, above all, hydrogenation catalysts containing metals of group VIII of the Mendeleev Periodic Table, such as rhodium, palladium, and platinum, or nickel, furthermore copper or chromium, preferably nickel. The said metals can be used either in colloidal or finely dispersed form or supported on carrier materials. As carrier materials substances that are inert and have a large surface are preferred, for example active carbon, silica gel or aluminum oxides.

The hydrogenation temperature should be as low as possible and in any case it should not exceed 250° C., because at higher temperatures the degree of dissociation of $\beta$-acetoxy-propionaldehyde becomes too high. On the other hand, at a temperature below 0° C. the speed of hydrogenation is too low. Hence, the hydrogenation is preferably carried out at a temperature in the range of from 0 to 150° C.

The hydrogenation pressure should be as high as possible so that a high concentration of hydrogen prevails at the catalyst. An increase in the partial pressure of hydrogen in the reaction vessel increases the reaction speed. It is, therefore, also possible to hydrogenate even at low temperatures, i.e. with a high selectivity. The upper pressure limit is merely defined by the technical possibilities. In practice, the reaction is carried out under a pressure of from 1 to 500 atmospheres, preferably 100 to 350 atmospheres.

The reaction can be performed either discontinuously in an autoclave or continuously in a flow apparatus. It is preferable, however, to operate in a flow apparatus in which temperature, pressure and concentration conditions can be optimized and thus the highest selectivities and space-time-yields can be obtained.

In the case of a continuous operation a sump phase reactor, fluidized bed reactor or trickling reactor may be used.

The reaction products remain in the reactor until hydrogen is no longer absorbed, i.e. possibly all $\beta$-acetoxy-propionaldehyde has been reacted. Depending on the reaction conditions, the time of reaction is in the range of from several minutes to several hours.

The main product of the reaction according to the invention is 1,3-propanediol monoacetate, which has not yet been described in literature. It is a water clear liquid boiling at 84° C. under 5 mm. of mercury. By saponification or reesterfication with an alcohol it can be transformed into 1,3-propanediol. By reesterification with an acid the monoacetate can be transformed into the corresponding mono- or di-esters of 1,3-propanediol. Besides 1,3-propanediol monoacetate a small amount of 1,3-propanediol diacetate is formed in the reaction of the invention. The selectivity of the reaction with respect to these two products is above 90% when the specified catalysts are used and the reaction is carried out under a pressure above 100 atmospheres and at a temperature below 80° C.

As by-products n-propanol and n-propyl acetate are formed in the first place, which are valuable compounds for further reactions and the amount of which depends on the reaction conditions.

The reaction products can be worked up by distillation. In general, the 1,3-propanediol diacetate need not be separated from the monoacetate as both products can jointly be transformed into 1,3-propanediol in known manner by reesterification or saponification. The acetic acid distilled off is recycled into the reactor as solvent.

The following examples illustrate the invention, the percentages being by weight unless otherwise stated.

EXAMPLE 1

(a) Preparation of the starting product

An equimolecular mixture of acrolein (water content below 1%) and glacial acetic acid was passed at room temperature over the acetate form of a basic ion exchange resin (carrier material polystyrene, active group triethylammonium acetate, particle size 0.4 to 0.6 mm.). With a residence time of about 24 hours the issuing product contained about 25 mole percent of β-acetoxy-propionaldehyde, corresponding to about 40% by weight. By evaporation in a thin layer evaporator under a pressure of 20 mm. of mercury and at 50° C., the solution was freed from unreacted acrolein and part of the unreacted acetic acid. The products separated by evaporation were used for preparing fresh starting solution. The evaporation residue consisting of a mixture of 78% of β-acetoxy-propionaldehyde, 20% of acetic acid and 2% of acrolein was used as starting product for the hydrogenation.

(b) Hydrogenation 200 grams of the β-acetoxy-propionaldehyde prepared according to (a) and 5 grams of a powdery nickel catalyst were introduced into a shaking autoclave having a capacity of 1 liter. The air in the autoclave was replaced by scavenging with hydrogen. The autoclave was pressurized with 130 atmospheres of hydrogen and heated at 60° C. During heating a strong absorption of hydrogen was observed. When the temperature of 60° C. was reached, the hydrogen pressure was again adjusted to 130 atmospheres. After 1 hour, the autoclave was allowed to cool. About 200 grams of a liquid were obtained containing about 30% of 1,3-propanediol monoacetate, 5% of 1,3-propanediol diacetate, 50% of acetic acid and 10% of a mixture of n-propanol and n-propyl acetate. The reaction mixture was separated by fractional distillation. At 84° C. under 5 mm. of mercury about 60 grams of a mixture of 1,3-propanediol monoacetate (90%) and 1,3-propanediol diacetate (10%) were obtained.

EXAMPLE 2

The 1 liter shaking autoclave was charged with 100 grams of β-acetoxy-propionaldehyde prepared as described in Example 1(a), 100 grams of glacial acetic acid and 5 grams of a nickel catalyst. The pressure in the autoclave adjusted to 320 atmospheres. The reaction mixture was worked up as described in Example 1(b). About 200 grams of a product consisting of approximately 20% of 1,3-propanediol monoacetate
10% of 1,3-propanediol diacetate
65% of acetic acid and
3% of n-propanol+n-propyl acetate were obtained.

The mixture was separated by fractional distillation.

EXAMPLE 3

The 1 liter shaking autoclave was charged with 200 grams of β-acetoxy-propionaldehyde prepared as described in Example 1(a) and 5 grams of a palladium/carbon catalyst (5% Pd). The reaction was carried out as described in Example 1(b). About 200 grams of a reaction product having the following composition:

40% of 1,3-propanediol monoacetate
5% of 1,3-propanediol diacetate
40% of acetic acid and
15% of n-propanol+n-propyl acetate were obtained.

The reaction mixture was worked up by fractional distillation.

What is claimed is:

1. A process for the manufacture of acetates of 1,3-propane-diol which comprises hydrogenating β-acetoxy-propionaldehyde in acetic acid solution with hydrogen under a pressure of from 1 to 500 atmospheres and at a temperature below 250° C. using a catalyst consisting essentially of at least one member in metallic form of the group consisting of nickel, rhodium, palladium and platinum.

2. The process of claim 1, wherein the reaction mixture contains 5 to 99% by weight of acetic acid.

3. The process of claim 1, wherein the reaction mixture contains 10 to 90% by weight of acetic acid.

4. The process of claim 1, wherein the pressure is in the range of from 100 to 350 atmospheres.

5. The process of claim 1, wherein the temperature is in the range of 0 to 150° C.

6. The process of claim 1, wherein a nickel catalyst is used.

References Cited

UNITED STATES PATENTS

| | | | |
|---|---|---|---|
| 3,518,310 | 6/1970 | Lutz | 260—635 A |
| 2,112,319 | 3/1938 | Wickert | 260—635 A |
| 2,802,024 | 8/1957 | Fasce | 260—635 A |

OTHER REFERENCES

Chemical Abstracts, 52:17960C.

VIVIAN GARNER, Primary Examiner

U.S. Cl. X.R.

260—488 J, 494, 635 A, 635 D, 638 A